US012768208B2

(12) United States Patent
Song et al.

(10) Patent No.: US 12,768,208 B2
(45) Date of Patent: Oct. 20, 2026

(54) COLD DRAW PROGRAMMABLE GRAYSCALE DIGITAL LIGHT PROCESSING 3D PRINTED SHAPE-MORPHING STRUCTURES AND METHODS OF FORMING THE SAME

(71) Applicant: Toyota Motor Engineering & Manufacturing North America, Inc., Plano, TX (US)

(72) Inventors: Yuyang Song, Ann Arbor, MI (US); Masato Tanaka, Ann Arbor, MI (US); Liang Yue, Atlanta, GA (US); Hang Qi, Marietta, GA (US)

(73) Assignees: Toyota Motor Engineering & Manufacturing North America, Inc., Plano, TX (US); Georgia Tech Research Corporation, Atlanta, GA (US)

( * ) Notice: Subject to any disclaimer, the term of this patent is extended or adjusted under 35 U.S.C. 154(b) by 388 days.

(21) Appl. No.: 18/233,989

(22) Filed: Aug. 15, 2023

(65) Prior Publication Data

US 2025/0059809 A1 Feb. 20, 2025

(51) Int. Cl.

| | |
|---|---|
| ***E05D 1/02*** | (2006.01) |
| ***B29C 64/124*** | (2017.01) |
| ***B33Y 10/00*** | (2015.01) |
| ***B33Y 80/00*** | (2015.01) |
| ***C08F 220/18*** | (2006.01) |

(Continued)

(52) U.S. Cl.

CPC ................ *E05D 1/02* (2013.01); *B33Y 80/00* (2014.12); *C08F 220/1811* (2020.02); *C09D 4/00* (2013.01); *C09D 7/63* (2018.01); *C09D 133/066* (2013.01); *F16C 11/04* (2013.01);

(Continued)

(58) Field of Classification Search

CPC ........... E05D 1/02; B33Y 80/00; B33Y 10/00; B33Y 70/00; C08F 220/1811; C08F 2800/20; C08F 2810/20; C09D 4/00; C09D 7/63; C09D 133/066; F16C 11/04; B29C 64/124

See application file for complete search history.

(56) References Cited

U.S. PATENT DOCUMENTS

2017/0129179 A1* 5/2017 Mandel ................. B29C 64/393
2018/0050486 A1 2/2018 Talgorn et al.

(Continued)

FOREIGN PATENT DOCUMENTS

WO 2009146352 A1 12/2009

OTHER PUBLICATIONS

Chen et al., Recyclable thermosetting polymers for digital light processing 3D printing, Materials and Design (197) (Year: 2021).*

(Continued)

*Primary Examiner* — Nathan L Van Sell
(74) *Attorney, Agent, or Firm* — Christopher G. Darrow; Darrow Mustafa PC

(57) ABSTRACT

A shape-morphing structure includes a cold draw programmable grayscale digital light processing 3D printed unitary hinge component comprising at least one glassy state portion and at least one rubbery state portion. The at least one glassy state portion has a glassy state recovery temperature and the at least one rubbery state portion has a rubbery state recovery temperature and different than the glassy state recovery temperature.

20 Claims, 10 Drawing Sheets

(51) Int. Cl.
*C09D 4/00* (2006.01)
*C09D 7/63* (2018.01)
*C09D 133/06* (2006.01)
*F16C 11/04* (2006.01)

(52) U.S. Cl.
CPC ............. *B29C 64/124* (2017.08); *B33Y 10/00* (2014.12); *C08F 2800/20* (2013.01); *C08F 2810/20* (2013.01)

(56) References Cited

U.S. PATENT DOCUMENTS

| | | | | |
|---|---|---|---|---|
| 2019/0283315 | A1* | 9/2019 | Feller | B22F 10/12 |
| 2021/0115167 | A1* | 4/2021 | Scott | C08F 222/40 |
| 2021/0354398 | A1* | 11/2021 | Pokrass | B33Y 70/00 |
| 2021/0369413 | A1 | 12/2021 | Li et al. | |
| 2022/0119569 | A1* | 4/2022 | Knopf | C08F 226/02 |

OTHER PUBLICATIONS

RevPart, Living Hinge Design: The Ultimate Guide, Archived on Jan. 17, 2022 (Year: 2022).*

Kerry Stevenson, "Using Shape-Memory Polymers In 3D Print Design", Retrieved from the Internet: https://www.fabbaloo.com/2019/01/using-shape-memory-polymers-in-3d-print-design—retrieved Dec. 21, 2022.

Kuang et al. "Grayscale digital light processing 3D printing for highly functionally graded materials." Science advances 5.5 (2019): eaav5790.

Jahangir et al. "microOhm Conductors Embedded into 3D-Printed Plastics", Retrieved from the Internet: https://passive-components.eu/microohm-conductors-embedded-into-3d-printed-plastics/ retrieved Apr. 20, 2023.

Kim et al. "Intermittent embedding of wire into 3D prints for wireless power transfer." International Journal of Precision Engineering and Manufacturing 22 (2021): 919-931.

Roach et al. "4D Printing Based on Multi-Material Design." Manufacturing in the Era of 4th Industrial Revolution: A World Scientific Reference vol. 1: Recent Advances in Additive Manufacturing. 2020. 163-194.

Montgomery et al. "Recent advances in additive manufacturing of active mechanical metamaterials." Current Opinion in Solid State and Materials Science 24.5 (2020): 100869.

* cited by examiner

COLD DRAW PROGRAMMABLE GRAYSCALE DIGITAL LIGHT PROCESSING 3D PRINTED SHAPE-MORPHING STRUCTURES AND METHODS OF FORMING THE SAME

TECHNICAL FIELD

The present disclosure generally relates to shape-morphing structures, and particularly to 3D printed shape-morphing structures.

BACKGROUND

Shape-morphing structures, i.e., structures that change shape in response to external stimuli, are used or employed in systems or devices such as soft robotic systems, deployable systems, wearable devices, and shape-shifting antennas, among others. However, the design, development and/or manufacturing of such shape-morphing structures can be time and/or cost intensive.

The present disclosure addresses issues with the design, development and/or manufacturing of shape-morphing structures, and other issues related to shape-morphing structures.

SUMMARY

In one form of the present disclosure, a shape-morphing structure includes a cold draw programmable grayscale digital light processing (g-DLP) 3D printed unitary hinge component comprising at least one glassy state portion and at least one rubbery state portion.

In another form of the present disclosure, a shape-morphing structure includes a cold draw programmable grayscale digital light processing (g-DLP) 3D printed unitary hinge component formed from a resin and comprising at least one glassy state portion and at least one rubbery state portion. In addition, the resin includes a donor moiety, an acceptor moiety, and a rigid moiety. The donor moiety is in the form of an acrylate monomer with a side group comprising at least one of a free carbonyl, a primary amine on an acrylate, a secondary amine on an acrylate, and a tertiary amine on an acrylate. The acceptor moiety is different than the donor moiety and in the form of an acrylate monomer with a side group comprising at least one of a free hydroxy, a primary amine, secondary amine, and an imine. And the rigid moiety is in the form of an acrylate monomer with a side group comprising one or more of a cyclohexyl, a substituted cyclohexyl, and a bicyclic structure.

In still another form of the present disclosure,

These and other features of the g-DLP 3D printed physical information storage units and their manufacture will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

Figure 1:
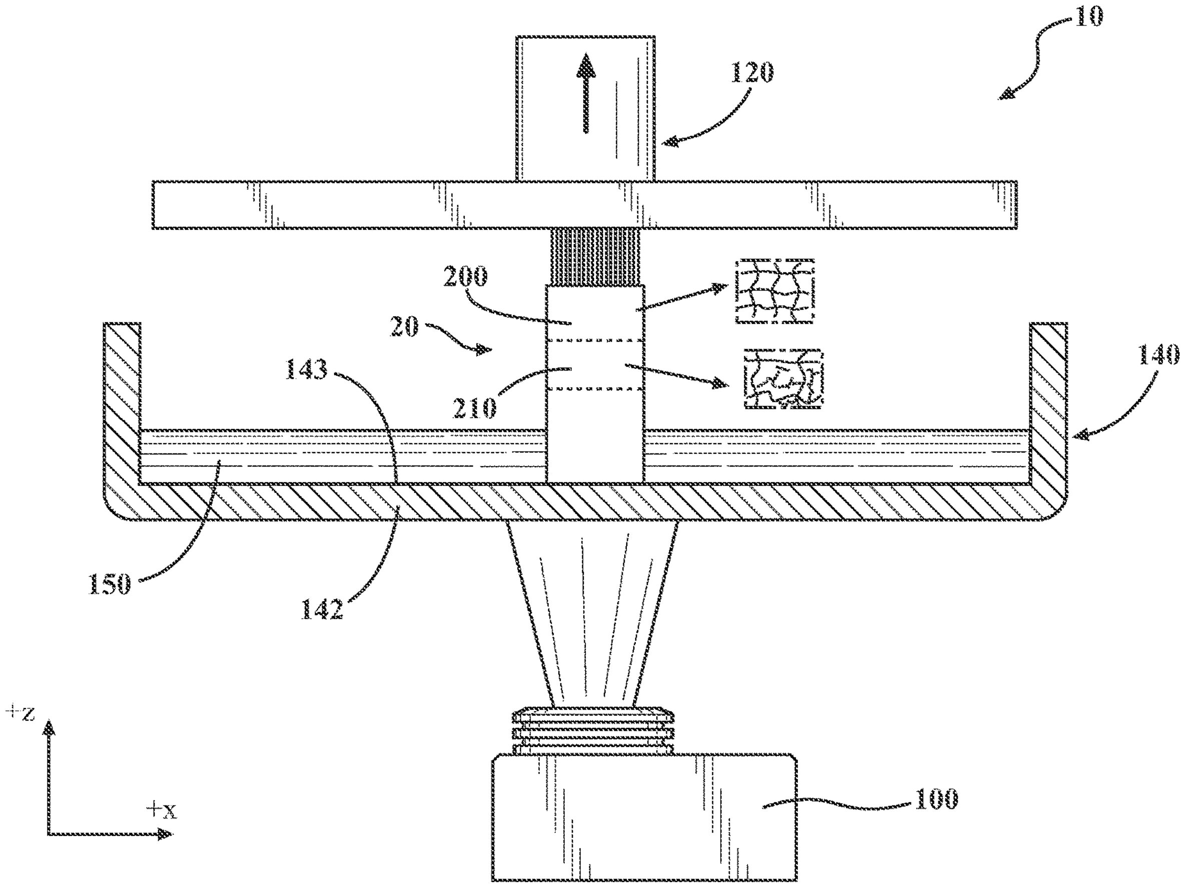
FIG. 1 illustrates a g-DLP 3D printer.

It should be noted that the figures set forth herein are intended to exemplify the general characteristics of the present technology for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides three dimensional (3D) printed shape-morphing structures, resins for single-vat single cure g-DLP 3D printing of shape-morphing structures, and 3D printing of shape-morphing structures. The shape-morphing structures are monolithic structures that include one or more stretchable soft organogel portions (also referred to herein as "rubbery portion(s)") and one or more stiff thermoset portions (also referred to herein as "glassy portion(s)"). That is, the single cure resins (also referred to herein simply as "resin" or "resins") have a composition that provides for g-DLP 3D printed shape-morphing structures that have one or more highly stretchable rubbery portions that exhibit low stiffness and high elasticity and one or more glassy portions that exhibit high stiffness and high strength within a single layer of printing. Accordingly, the use or need of multiple vats of different resins is not needed or required for g-DLP 4D printing of shape-morphing structures according to the teachings of the present disclosure. As used herein, the phrase "4D printing" refers to 3D printing an object or structure that is able to predictably change its shape or properties over time in reaction to conditions such as exposure to water, air, heat, and/or an electric current.

The shape-morphing structures according to the teachings of the present disclosure are cold draw programmable into one or more shapes. As used herein, the phrase "cold draw programmable" refers to a g-DLP 3D printed structure that is or can be formed into a stable shape using a cold draw technique as disclosed herein, and the phrase "stable shape" refers to a shape of a g-DLP 3D printed structure that does not change when the g-DLP 3D printed structure is at a predefined temperature that is less than a recovery temperature. For example, in some variations shape-morphing g-DLP 3D printed structures according to the teachings of the present disclosure have at least one glassy state portion with a glassy state recovery temperature and at least one rubbery state portion with a rubbery state recovery temperature that is different than the glassy state recovery temperature.

In some variations, a monolithic structure manufactured with a g-DLP 3D printer using a resin according to the teachings of the present disclosure exhibits Young Moduli ranging from about 10 MPa to about 100 MPa. In at least one variation, a monolithic structure manufactured with a g-DLP 3D printer using a resin according to the teachings of the present disclosure exhibits Young Moduli ranging from about 10 MPa to about 200 MPa. In some variations a monolithic structure manufactured with a g-DLP 3D printer using a resin according to the teachings of the present disclosure exhibits Young Moduli ranging from about 10 MPa to about 300 MPa. And in at least one variation, a monolithic structure manufactured with a g-DLP 3D printer using a resin according to the teachings of the present disclosure exhibits Young Moduli ranging from about 10 MPa to about 400 MPa or from about 10 MPa to about 478 MPa.

In some variations, a monolithic structure manufactured with a g-DLP 3D printer using a resin according to the teachings of the present disclosure exhibits Young Moduli ranging from about 8 MPa to about 100 MPa. In at least one variation, a monolithic structure manufactured with a g-DLP 3D printer using a resin according to the teachings of the present disclosure exhibits Young Moduli ranging from about 5 MPa to about 100 MPa. In some variations a monolithic structure manufactured with a g-DLP 3D printer using a resin according to the teachings of the present disclosure exhibits Young Moduli ranging from about 2 MPa to about 100 MPa. And in at least one variation, a monolithic structure manufactured with a g-DLP 3D printer using a resin according to the teachings of the present disclosure exhibits Young Moduli ranging from about 1 MPa to about 100 MPa or from about 0.5 MPa to about 100 MPa or from about 0.1 MPa to about 100 MPa.

In some variations, a monolithic structure manufactured with a g-DLP 3D printer using a resin according to the teachings of the present disclosure exhibits Young Moduli ranging from about 5 MPa to about 200 MPa. In at least one variation, a monolithic structure manufactured with a g-DLP 3D printer using a resin according to the teachings of the present disclosure exhibits Young Moduli ranging from about 2 MPa to about 200 MPa. In some variations a monolithic structure manufactured with a g-DLP 3D printer using a resin according to the teachings of the present disclosure exhibits Young Moduli ranging from about 1 MPa to about 300 MPa. And in at least one variation, a monolithic structure manufactured with a g-DLP 3D printer using a resin according to the teachings of the present disclosure exhibits Young Moduli ranging from about 0.5 MPa to about 400 MPa or from about 0.1 MPa to about 475 MPa.

In some variations, a monolithic structure manufactured with a g-DLP 3D printer using a resin according to the teachings of the present disclosure exhibits an elastic elongation up to 100%. And in some variations, a monolithic structure manufactured with a g-DLP 3D printer using a resin according to the teachings of the present disclosure exhibits an elastic elongation up to 200%, up to 300%, up to 400%, up to 450%, or over 450%, e.g., up to 750% elastic elongation or up to 1000% elongation. Stated differently, a monolithic structure manufactured via g-DLP 3D printing using a resin according to the teachings of the present disclosure has at least one portion with low stiffness and high elasticity and at least one portion with high stiffness and high strength as described in greater detail below.

It should be understood that 3D printing allows for the fabrication of components and structures with geometric and material complexities beyond what is physically and/or economically possible with traditional manufacturing techniques such as casting, machining, cold working, hot working, among others. And new 3D printing capabilities have demonstrated use in functional applications or structures such as deployable structures, soft robotics, flexible electrical components, and biomimetic designs. However, many functional applications such as nature-like structures, airless tires, multi-stable absorbers, and 4D printing require the use of materials with vastly different properties. That is, such structures have or require different portions with very different mechanical and/or physical properties.

It should also be understood that DLP 3D printing is a high-speed and high-resolution printing method that has become increasingly popular in recent years. Digital light processing uses a projector to irradiate hundreds or thousands of thin layers of resin having predefined cross-sections of a solid component such that each thin layer is cured and the solid component is manufactured layer-by-layer. In a typical DLP printing process, a single resin vat is used, only z-direction motion of a build plate is needed to form a component, and photopolymerization (or photocuring) of the thin layers occurs in a few seconds. Accordingly, DLP 3D printing is one of the fastest 3D printing technologies. However, the use of a single resin vat makes DLP in general, not suitable for printing components with multiple material properties. Methods using multiple vats have been developed to print two or more materials by transferring a printed component between multiple vats. However, cross-contamination between multiple vats, switching between different resin vats and cleaning significantly slows down the printing speed.

In g-DLP printing, the local degree of monomer conversion (curing) is controlled by light intensity, which is manipulated at pixel level by an input grayscale image. For example, and with reference to FIG. 1, a g-DLP 3D printer 10 with a projector 100, build platform 120, and a single resin vat 140 containing a resin 150 according to the teachings of the present disclosure is shown. The projector 100 is configured to project a grayscale image onto a transparent bottom wall 142 of the single resin vat 140 such that a layer of the resin 150 having a predefined cross-section of a component 20 with at least one crosslinked stiff thermoset portion 200 and at least one stretchable soft organogel portion 210 is illuminated and cured. After the layer of the resin 150 is illuminated (and cured) via the grayscale exposure from the projector 100, the build platform 120 moves in the +z-direction shown in the figure and the resin 150 flows into or between the mostly cured layer of resin and an upper surface 143 of the transparent bottom wall 142. Then, the projector 100 projects another grayscale image onto the transparent bottom wall 142 of the single resin vat 140 such that the most recent layer of the resin 150 is illuminated with another predefined cross-section of the component 20. The process or cycle continues until manufacture of the component 20, layer-by-layer, is complete.

Figure 2A:
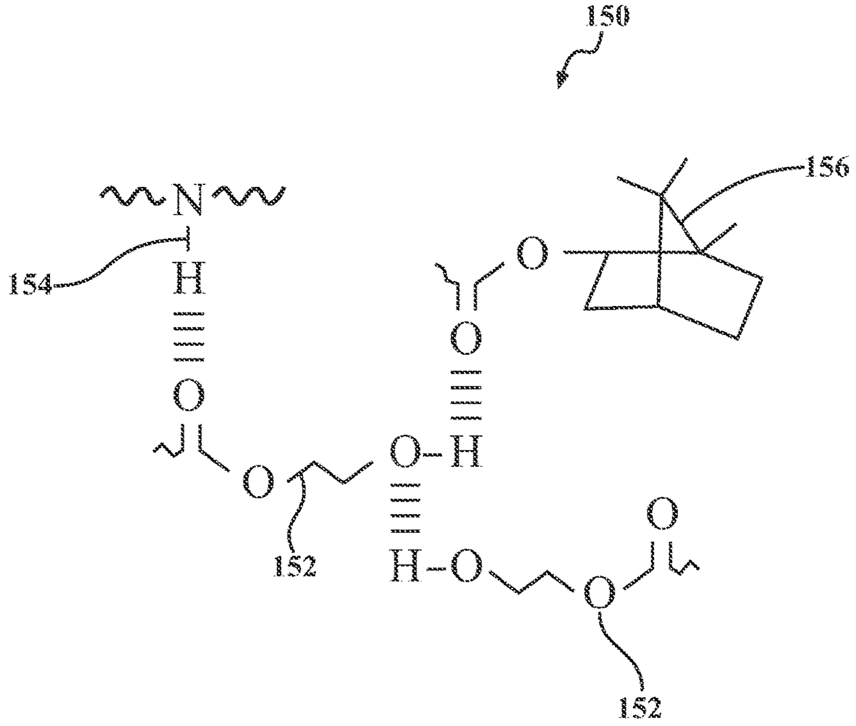
FIG. 2A illustrates a resin according to the teachings of the present disclosure with hydrogen bonding between a donor moiety, an acceptor moiety, and a rigid moiety.
Figure 2B:
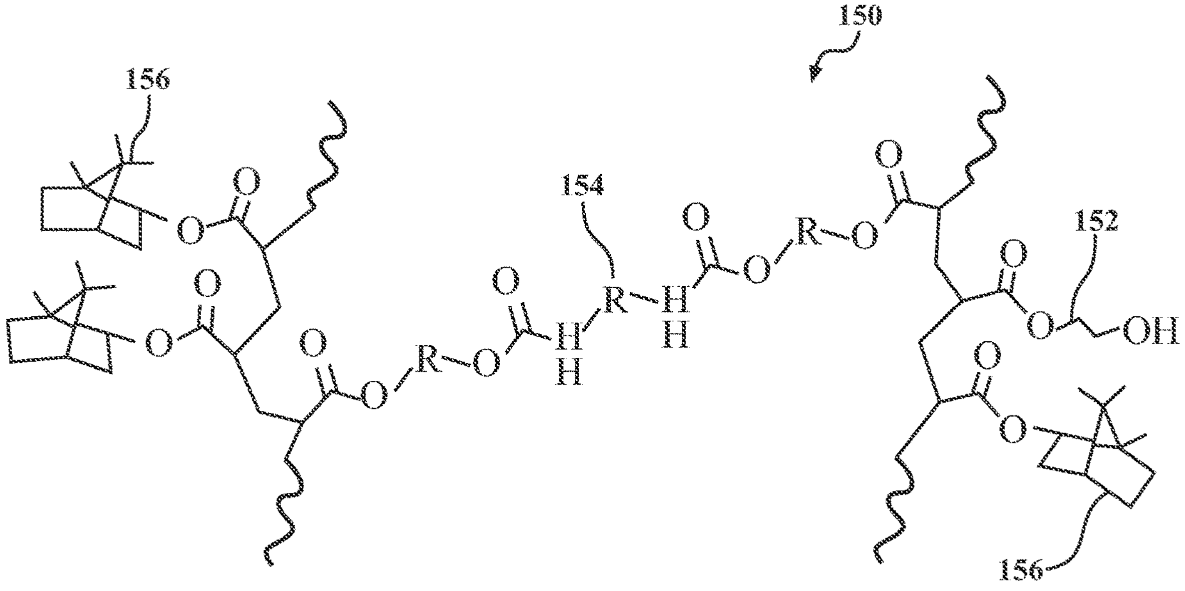
FIG. 2B illustrates the resin in FIG. 2A with cross-linking between the donor moiety, the acceptor moiety, and the rigid moiety.

Referring to FIGS. 2A-2B, one non-limiting example of three monomers included in the resin 150 are shown. Particularly, the resin 150 includes at least one hydrogen bond donating monomer 152 (2-hydroxyethyl acrylate shown in the figures), at least one hydrogen bond accepting monomer 154 (aliphatic urethane-based diacrylate shown in the figures), and at least one rigid monomer 156 (isobornyl acrylate shown in the figures). In some variations, the at least one hydrogen bond donating monomer 152 can also be a hydrogen bond accepting monomer that is different than the at least one hydrogen bond accepting monomer 154 and/or at the least one hydrogen bond accepting monomer 154 can also be a hydrogen bond donating monomer that is different than the at least one hydrogen bond donating monomer 152.

In some variations, the at least one hydrogen bond donating monomer 152 (also referred to herein as "donator moiety 152") is an acrylate monomer with one or more side groups that include a free carbonyl (—C═O) group or primary, secondary, or tertiary amine side group on an acrylate. And in at least one variation, the at least one hydrogen bond accepting monomer 154 (also referred to herein as "acceptor moiety 154") is an acrylate monomer with one or more side groups that include a free hydroxy (—OH), a primary or secondary amine (—N(H)—, e.g., a urethane (C(O)—N(H)—), or an imine (—N═). And the at least one rigid monomer 156 (also referred to herein as "rigid moiety 156") can be an acrylate monomer with one or more side groups that include one or more of cyclohexyls, substituted cyclohexyls, bicyclic side groups such as isobornyl, norbornyl, and dicyclopentanyl, among others. In addition, the donator moiety 152 and/or the acceptor moiety 154 is an oligomer (e.g., aliphatic urethane-based diacrylate) that functions as a crosslinker.

Non limiting examples of the at least one hydrogen bond donating monomer 152 include 2-hydroxyethyl acrylate (2-HEA), caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate. Non-limiting examples of the at least one hydrogen bond acceptor monomer 154 include aliphatic urethane-based diacrylate (AUD) and 2-HEA. And non-limiting examples of the at least one rigid monomer 156 include isobornyl acrylate (IOBA), 4-acryloylmorpholine, methyl methacrylate, 2-hydroxyethyl methacrylate, and isobornyl methacrylate.

In some variations, resins according to the teachings of the present disclosure (also referred to herein simply as "resin 150") include between about 5 weight percent (wt %) and about 35 wt % of the at least one hydrogen bond donator monomer 152, and in at least one variation the resin 150 includes between about 10 wt % and about 30 wt % of the least one hydrogen bond donator monomer 152. And in some variations, the resin 150 includes between about 15 wt % and about 25 wt % of the least one hydrogen bond donator monomer 152. For example, in at least one variation the resin 150 includes about 20 wt % of the least one hydrogen bond donator monomer 152.

In some variations the resin 150 includes between about 5 wt % and about 35 wt % of the at least one hydrogen bond acceptor monomer 154, and in at least one variation the resin 150 includes between about 10 wt % and about 30 wt % of the least one hydrogen bond acceptor monomer 154. And in some variations, the resin 150 includes between about 15 wt % and about 25 wt % of the least one hydrogen bond acceptor monomer 154. For example, in at least one variation the resin 150 includes about 20 wt % of the least one hydrogen bond acceptor monomer 154.

In some variations the resin 150 includes between about 45 wt % and about 75 wt % of the at least one rigid monomer 156, and in at least one variation the resin 150 includes between about 50 wt % and about 70 wt % of the least one rigid monomer 156. And in some variations, the resin 150 includes between about 55 wt % and about 65 wt % of the least one rigid monomer 156. For example, in at least one variation the resin 150 includes about 60 wt % of the least one rigid monomer 156.

In some variations, the resin 150 includes a photoinitiator. For example, in some variations the resin includes between about 0.1 wt % and about 2 wt % of the photoinitiator, for example between about 0.4 wt % and 1.6 wt % of the photoinitiator or between about 0.7 wt % and about 1.3 wt % of the photoinitiator. In at least one variation the resin 150 includes about 1.0 wt % of the photoinitiator. Non-limiting examples of the photoinitiator include photoinitiator 819 (phenylbis(2,4,6-trimethylbenzoyl)phosphine oxide) and camphorquinone.

In some variations, the resin 150 includes a photoabsorber. For example, in some variations the resin includes between about 0.01 wt % and about 1 wt % of the photoabsorber, for example between about 0.025 wt % and 0.5 wt % of the photoabsorber or between about 0.04 wt % and about 0.1 wt % of the photoabsorber. In at least one variation the resin 150 includes about 0.05 wt % of the photoabsorber.

Non-limiting examples of the photoabsorber include methylene, coccine, and tartrazine.

In an effort to better describe the resin 150, its properties, and its capabilities for manufacturing monolithic shape-morphing structures with a range of properties, and yet not to limit the scope of the present disclosure in any manner, one example composition of the resin 150 and numerous examples of monolithic shape-morphing structures and corresponding properties are discussed below.

The resin 150 was prepared by mixing monomers of 2-hydroxyethyl acrylate (Sigma-Aldrich, MO, USA), isobornyl acrylate (Sigma-Aldrich), and AUD (Ebecryl 8413, Allnex, GA, USA) with a weight ratio of 20:60:20. Then, 1 wt % photoinitiator (Irgacure 819, Sigma-Aldrich) and 0.05 wt % photo absorber (Sudan I, Sigma Aldrich) were added to the mixture of monomers.

Not being bound by theory, the IBOA and 2-HEA were included as linear chain builders and AUD as a crosslinker. The AUD is a viscous oligomer with high molecular weight aliphatic chains and urethane units, and forms H—N . . . O hydrogen bonds when interacting with 2-HEA and IBOA monomers. Also, the 2-HEA provides abundant —OH groups that form additional O—H . . . O hydrogen bonds.

At a low degree of curing (also known as "degree of cure" and referred to herein as "DoC"), the covalent network with the prevalent hydrogen bonds of the cured resin provides high stretchability in a rubbery state as illustrated in FIG. 2A, while at high DoC, the stiff IBOA exhibits a glass transition temperature ($T_g$) above room temperature as illustrated in FIG. 2B, thereby yielding glassy behaviors with high moduli.

Referring to FIGS. 3-6, test results are shown for g-DLP 3D printed samples formed from the resin 150 in a bottom-up DLP printer where light was projected from the bottom of the vat. The bottom-up DLP printer employed a 385 nm UV-LED light projector (PR04500, Wintech Digital Systems Technology Corp., Carlsbad, CA, USA) and a linear translation stage (LTS150 Thorlabs, Newton, NJ, USA). A container with an oxygen-permeable window (Teflon AF-2400, Biogeneral Inc., CA, USA) was used as the resin vat.

Designs of the g-DLP 3D printed samples were sliced into image files with a thickness of 0.05 mm and then converted into grayscaled image files with a MATLAB script. The continuous liquid interface production (CLIP) approach was utilized at the optimized speed of 3 s/layer to print the designed 3D structures. The light intensity of the printer was calibrated with a photometer (ILT1400-A Radiometer, International Light Technologies Inc., MA, USA) before printing.

In one set of tests, three g-DLP 3D printed samples were formed from the resin 150 using three grayscale levels. Particularly, two g-DLP 3D printed samples were formed using two different high degrees of curing (DoCs) and one g-DLP 3D printed sample was formed using a low level DoC. That is, each g-DLP 3D printed sample was formed using a single DoC such that testing of the resin 150 g-DLP 3D printed using three different DoCs was performed.

Figure 3:
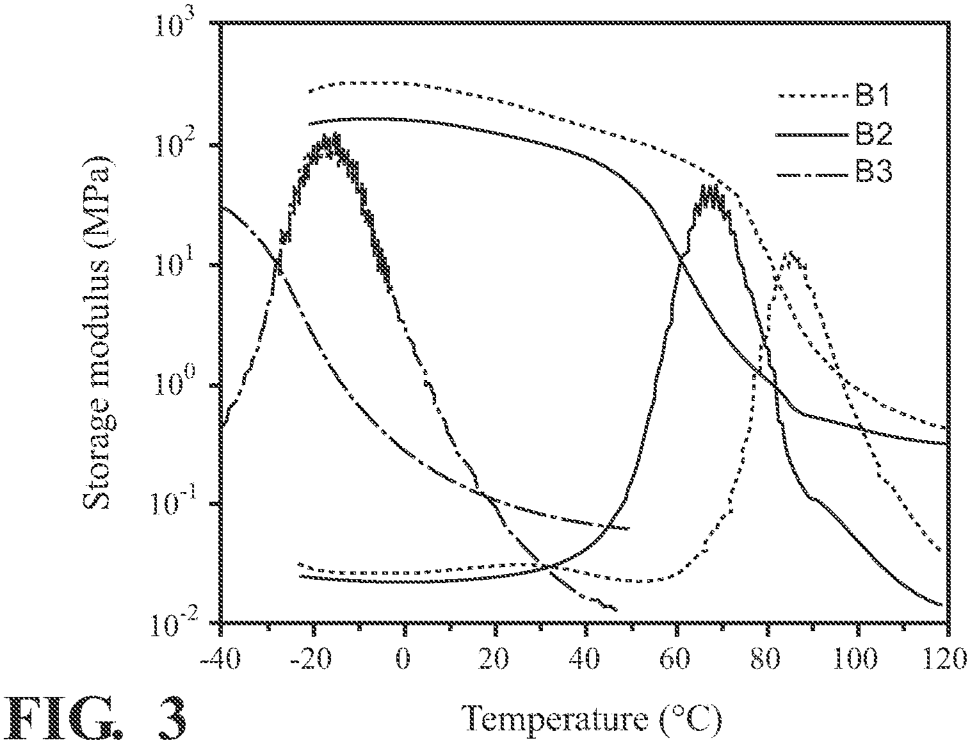
FIG. 3 is a graphical plot of storage modulus and tan δ as a function of temperature for three different grayscale level samples (labeled B1, B2, B3) formed using a resin and g-DLP 3D printing according to the teachings of the present disclosure and using.

Referring specifically to FIG. 3, the thermomechanical properties of the three g-DLP 3D printed samples with the three different DoCs were evaluated with dynamic mechanical analyses (DMA). The two g-DLP 3D printed samples formed using the two high DoCs (labeled B1 and B2) resulted in glassy states at room temperature with distinct glass transition temperatures (Tg) of 87° C. and 66° C., respectively. By comparison, the sample formed using the low DoC (labeled B3) resulted in an organogel state with a much lower Tg of −14° C. In addition, the three g-DLP 3D printed samples exhibited typical thermoset behaviors with a rapid drop of storage modulus above the Tg to a cross-linked rubbery plateau. For example, the B1 and B2 samples were both glassy thermosets at room temperature with the B2 component starting to transition to a soft and rubbery state at about 50° C., while the B1 component remained in the glassy state until about 75° C.

Figure 4:
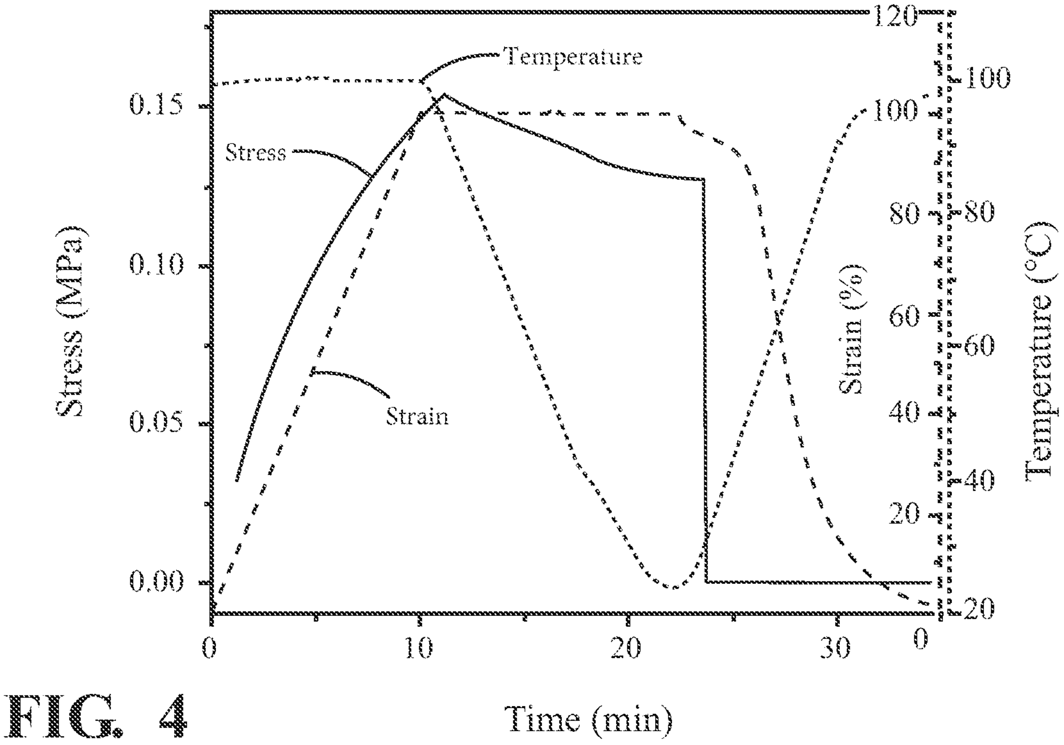
FIG. 4 is a graphical plot of shape memory performance of the B1 sample shown in FIG. 3.
Figure 5:
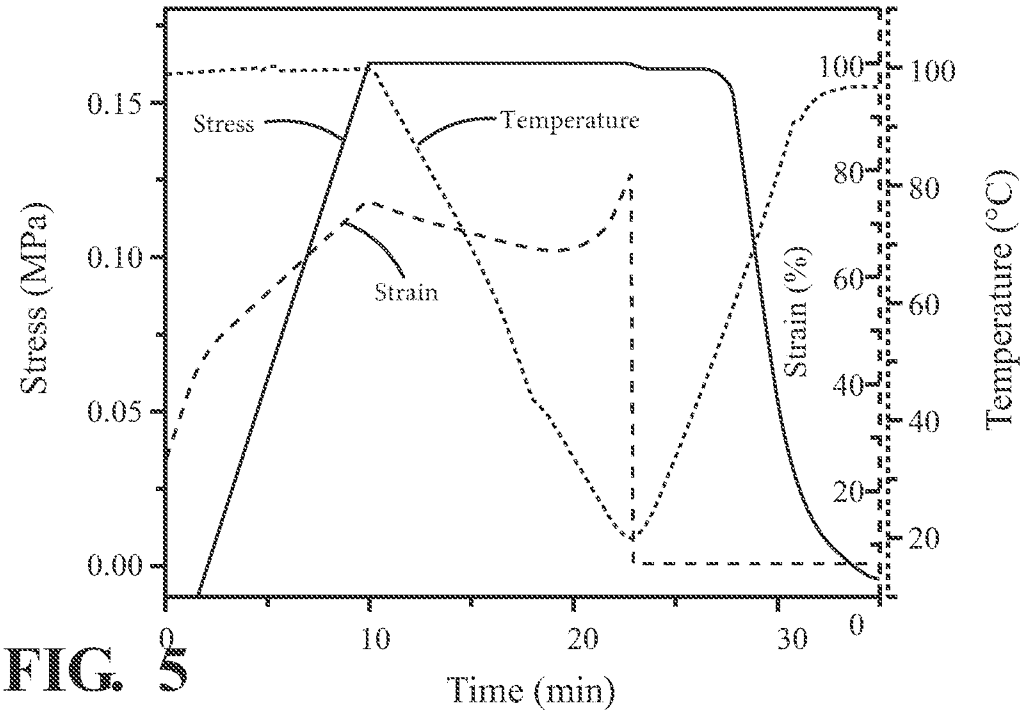
FIG. 5 is a graphical plot of shape memory performance of the B2 sample shown in FIG. 3.
Figure 6:
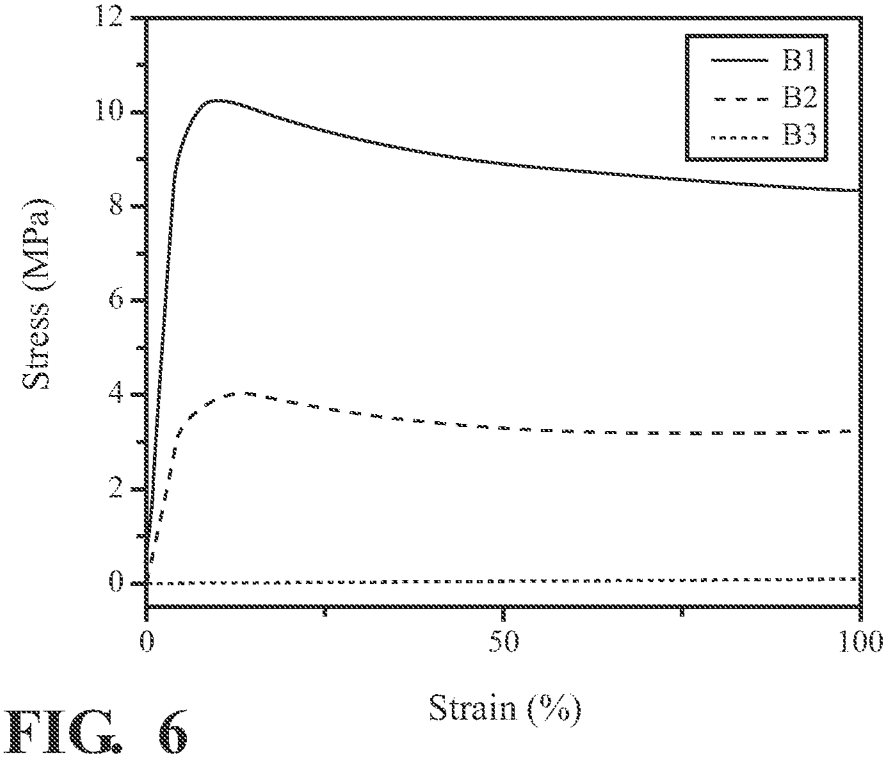
FIG. 6 is a graphical plot of stress versus strain for the B1, B2, and B3 samples shown in FIG. 3.

Referring now to FIGS. 4 and 5, shape-memory (SM) cyclic testing was performed to examine the shape-memory behavior of the B1 sample (FIG. 4) and the B2 sample (FIG. 5). Both samples were subjected to 100% strain ($\varepsilon_p$) at a programming temperature of 100° C. and then cooled to 25° C. The load used to strain the samples was then removed such that a temporarily fixed strain $\varepsilon_T$ and a shape fixing ratio '$\varepsilon_T/\varepsilon_p$' were obtained. The temperature was then gradually increased from 25° C. to activate free recovery of the strained (deformed) samples and a shape recovery ratio '$(\varepsilon_T-\varepsilon_R)/\varepsilon_T$' was calculated after measuring a recovered strain ER. The glassy states of the B1 and B2 samples exhibited excellent shape fixing ratios of 96.9% and 95.8%, respectively, and shape recovery ratios of 100% (for B1 and B2) under the large deformation. And with reference to FIG. 6, the strain-stress behaviors of the B1, B2, and B3 samples were measured using uniaxial tensile tests with the B1 and B2 samples displaying typical glassy and ductile behavior, and the B3 sample displaying soft and stretchable behavior.

Figure 7E:
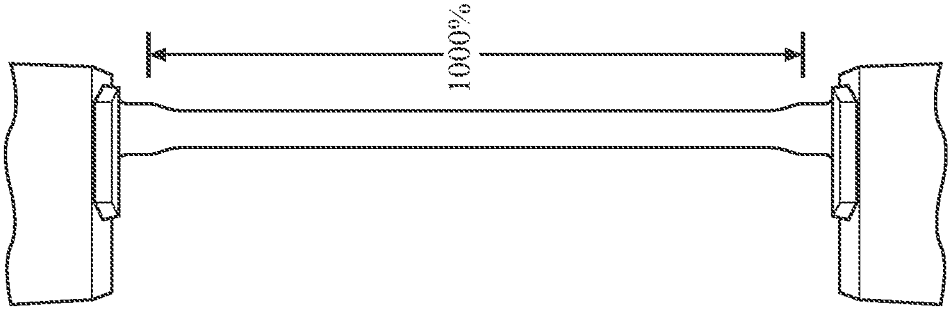
FIG. 7E illustrates the B3 grayscale portion of the g-DLP 3D printed sample in FIG. 7A exhibiting 1000% elastic deformation at RT.
Figure 7A:
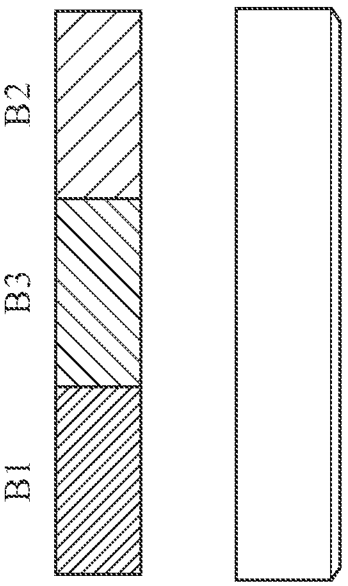
FIG. 7A illustrates a g-DLP 3D printed sample having three grayscale levels (labeled B1, B2, B3)
Figure 7B:
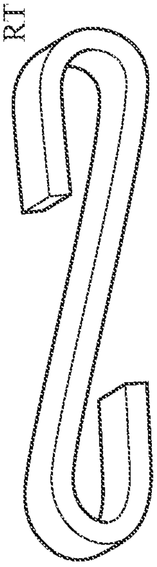
FIG. 7B illustrates the g-DLP 3D printed sample in FIG. 7A at room temperature (RT) after being cold draw programmed into a new shape at 80° C.
Figure 7C:
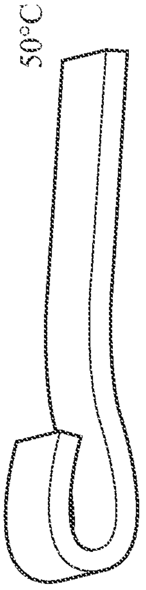
FIG. 7C illustrates the g-DLP 3D printed sample in FIG. 7B recovered at 50° C.
Figure 7D:
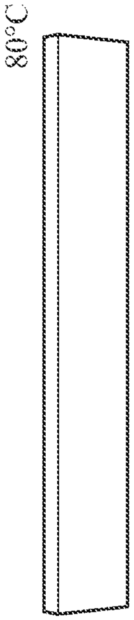
FIG. 7D illustrates the g-DLP 3D printed sample in FIG. 7C recovered at 80° C.

To verify the g-DLP as a feasible platform for 4D printing, and with reference to FIG. 7A, a strip sample with two glassy ends (B1 and B2) and a rubbery middle section (B3) was g-DLP 3D printed for programming and recovery testing. Particularly, the two glassy B1, B2 ends were programmed (bent) at 80° C. and fixed in place as illustrated in FIG. 7B by rapid cooling the strip sample in an ice bath. The strip sample was placed into a 50° C. water bath where the B2 end shifted (recovered) to its original shape as illustrated in FIG. 7C, and then the water bath temperature was increased to 80° C. which resulted in the B1 end returning to its original shape (FIG. 7D). In addition, the rubbery middle section B3 was successfully stretched 1000% and recovered at room temperature (i.e., about 22° C.) as illustrated in FIG. 7E.

Figure 8:
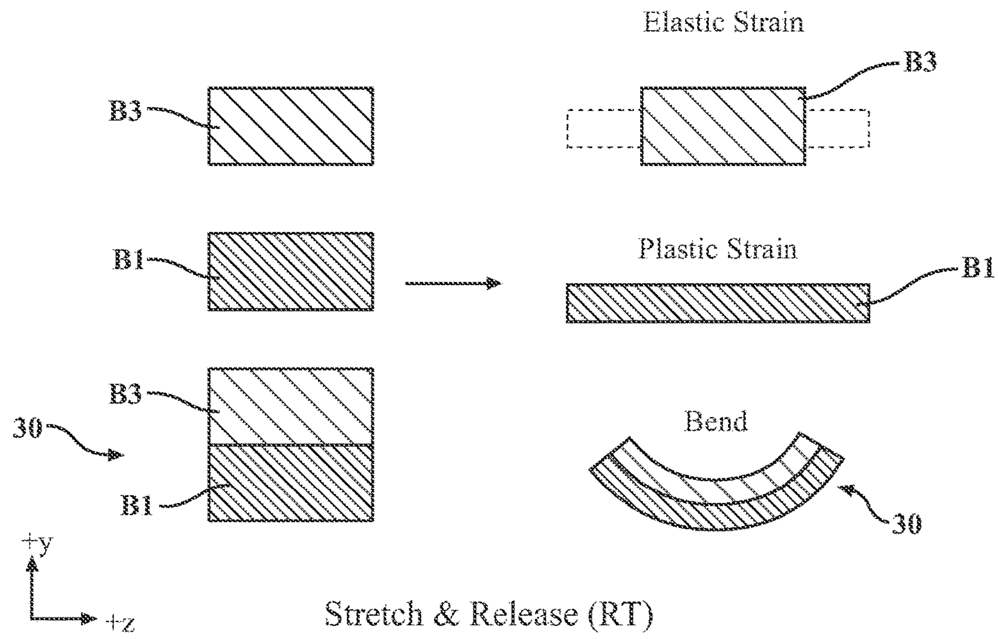
FIG. 8 illustrates a bilayer composite formed from a B1 grayscale layer and a B3 grayscale layer.

Referring now to FIG. 8, a classical mechanically actuated bilayer structure 30 composed of a B1 layer and B3 layer is shown with the rubbery B3 layer undergoing recoverable elastic strain and the glassy B1 layer undergoing unrecoverable plastic strain when the bilayer structure 30 is strained in the z-direction shown in the figure. And as illustrated in FIG. 8, the mismatch of strain recovery between the B1, B3 bilayer composite results in a bending deformation in the y-direction shown in the figure.

Figure 9:
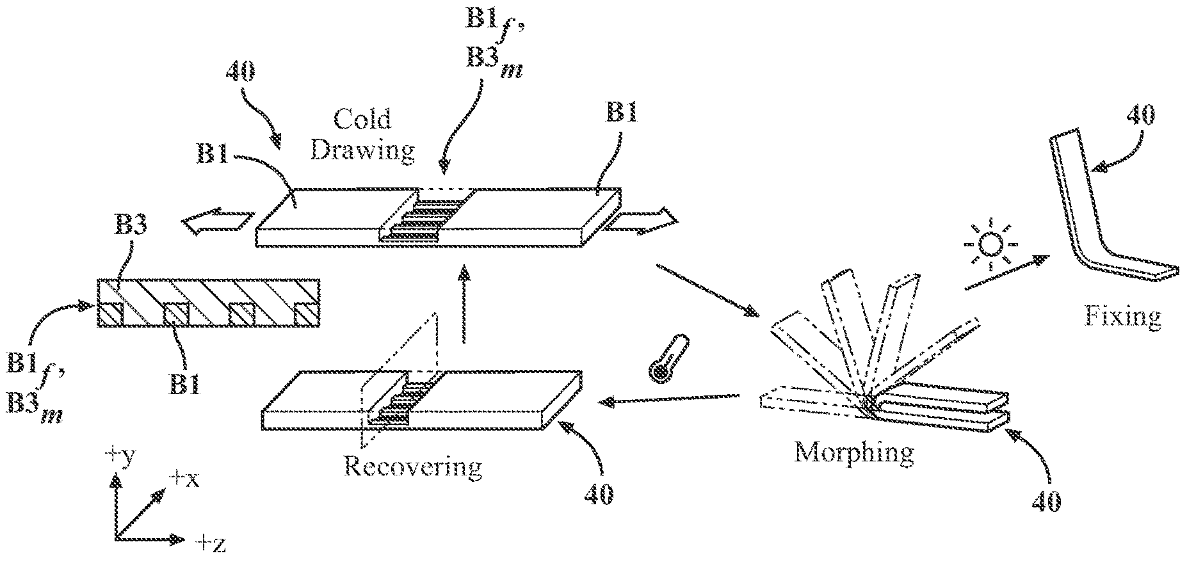
FIG. 9 illustrates a heterogeneous hinge module with a B1 grayscale+B3 grayscale hinge exhibiting shape-morphing and recovery according to the teachings of the present disclosure.

Referring to FIG. 9, and based on the classical actuated bilayer mechanism 30 illustrated in FIG. 8, a g-DLP platform to print a heterogeneous hinge module 40 with glassy B1 fibers (labeled Bit) embedded in a rubbery B3 matrix (labeled $B3_m$ and also referred to herein as a "rubbery state matrix") was developed (the $B3_m$ matrix in the perspective drawings/figures is illustrated as transparent for clarity). Particularly, the heterogeneous hinge module 40 (also referred to herein simply as "hinge module 40") included a pair of B1 ends (also referred to herein as "glassy state portions" or "glassy state ends") and a middle or hinge $B1_f$, $B3_m$ portion (also referred to herein as a "heterogeneous portion") disposed between the B1 ends. And unlike the bilayer structure 30 shown in FIG. 8, the hinge module 40 was stretchable at room temperature using low external forces.

Not being bound by theory, a folding angle '$\theta_f$' (not shown in FIG. 9) of the hinge module 40 depends on the mechanical properties and geometric designs of the two constituent materials (i.e., hinge dimensions, fiber position and dimensions, etc.) and an analytical model for the folding $\theta_f$ angle of the hinge module 40, based on those parameters, can be expressed as:

$$\theta_f = \kappa l_H (1 + \varepsilon_{NP}) \tag{1}$$

where $\kappa$ is the bending curvature, $l_H$ is the length of the hinge, and $\varepsilon_{NP}$ is the axial strain (perpendicular to cross-section) of a neutral plane due to force balance represented by:

$$\varepsilon_{NP} = \frac{E_f A_f}{E_f A_f + E_m A_m} \varepsilon_{fix} \tag{2}$$

where $E_f$ and $E_m$ denote the Young's modulus of the fiber and matrix, $A_f$ and $A_m$ the total area of the fiber and matrix in the cross-section, respectively, and $\varepsilon_{fix}$ denotes the residual strain of glassy fiber due to stretch. Note that the neutral plane has zero longitudinal strain due to the bending deformation. In addition, using the Euler-Bernoulli beam theory, the bending curvature K can be derived as:

$$\kappa = \frac{E_m A_m (\overline{y}_m - \overline{y}_f)\varepsilon_{NP}}{E_f I_{NP-A_f} + E_m I_{NP-A_m}} \tag{3}$$

where $\overline{y}_f$ and $\overline{y}_m$ are the area-mean y position of the fiber and matrix, respectively, and $I_{NP-f}$ and $I_{NP-m}$ are the second area moment of the fiber and matrix with respect to the neutral plane, respectively.

Figure 10:
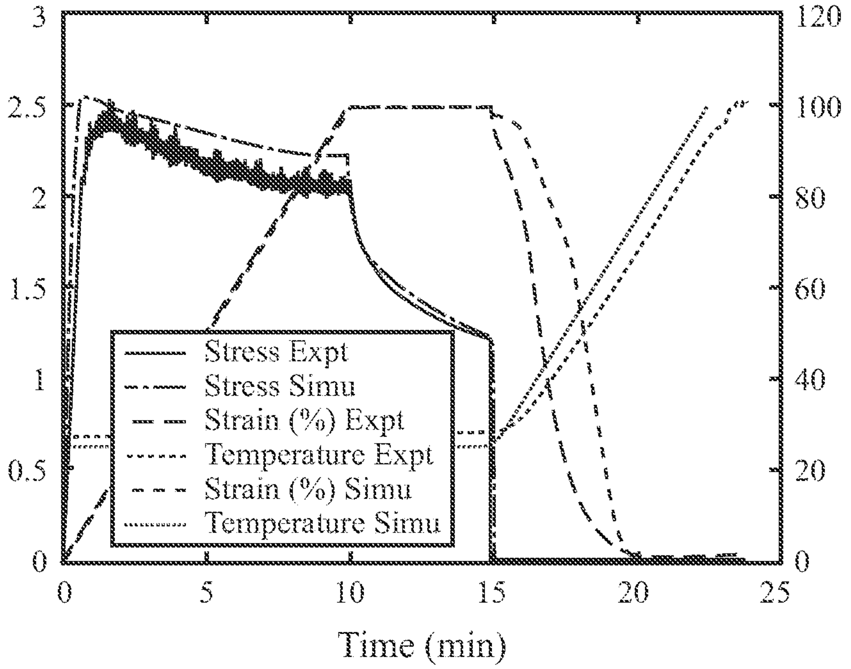
FIG. 10 is a graphical plot of fitting experimental data for stress, strain, and temperature as a function of time for a B1 g-DLP 3D printed sample according to the teachings of the present disclosure.
Figure 11:
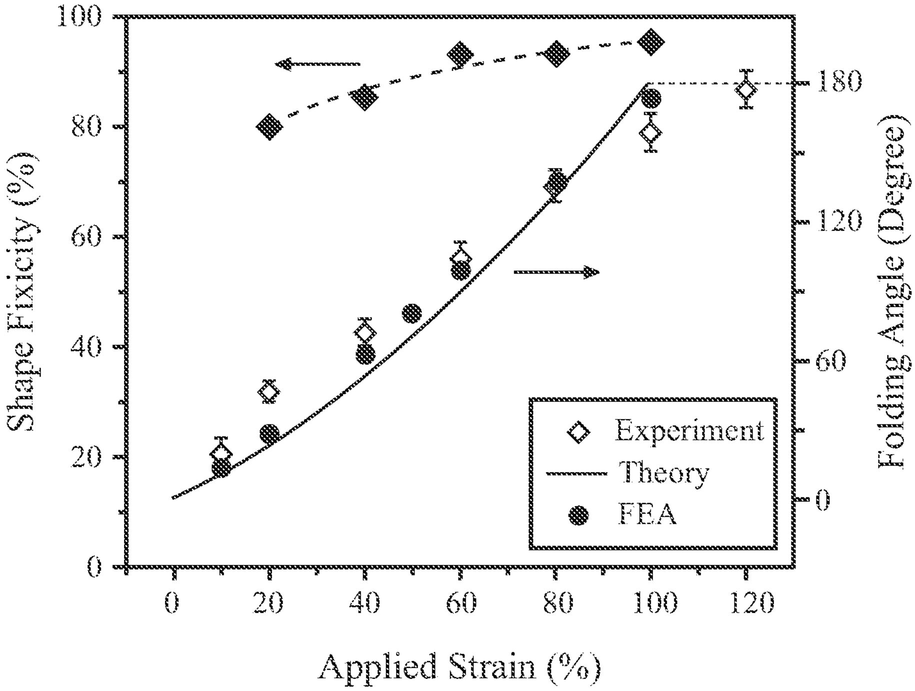
FIG. 11 is a graphical plot of simulated and experimental shape fixity and folding angle as a function of applied strain for a B1 g-DLP 3D printed sample according to the teachings of the present disclosure.

It should be understood that the analytical prediction of the folding angle $\theta_f$ relies on $\varepsilon_{fix}$ as an explicit function of an applied strain ($\varepsilon_{app}$) and the visco-plasticity of a given material, which is hard to obtain for some or all of the materials disclosed herein due to the complex constitutive behavior of, e.g., the glassy B1 material. However, an empirical form can be obtained by fitting experimental data for a given material. For example the empirical relation $$\varepsilon_{fix} = -0.27\varepsilon_{app}^2 + 0.51\varepsilon_{app} + 0.71$$

was obtained by fitting the experimental data for the B1 material shown in FIG. 10. And using this empirical formula and Eqs.(1)-(3), the theoretical prediction of the strain-angle relation achieves good agreement with finite element analysis (FEA) and experiment as shown in FIG. 11.

Figure 12:
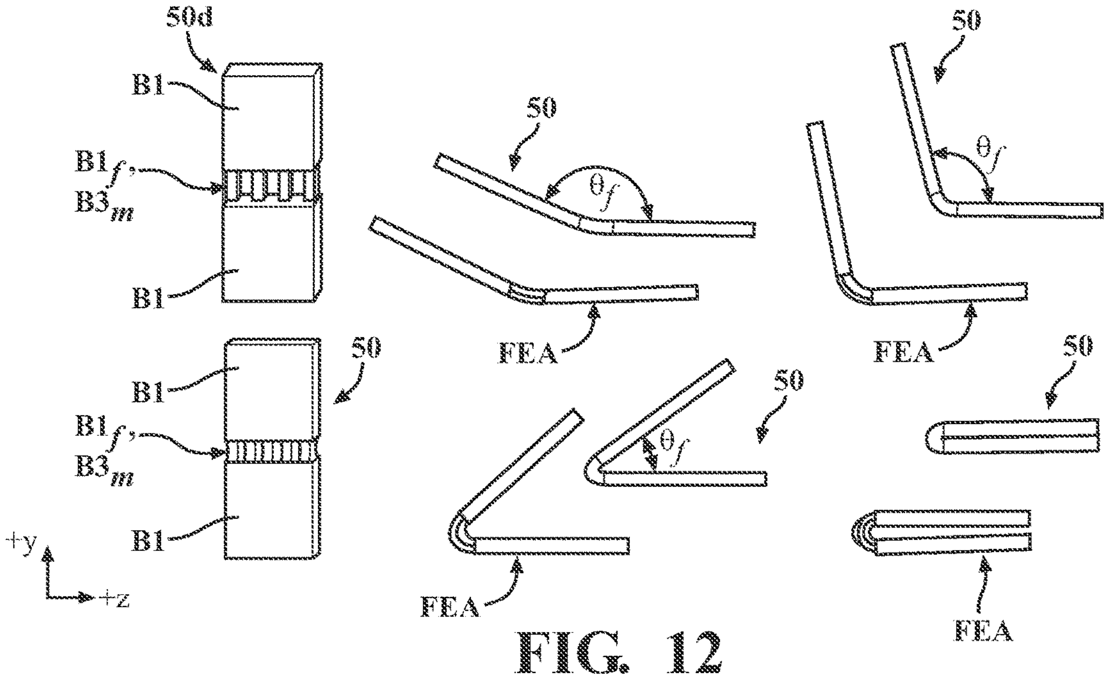
FIG. 12 illustrates a designed and a g-DLP 3D printed hinge module with different amounts of cold draw bending according to the teachings of the present disclosure.

Referring now to FIG. 12, a g-DLP 3D printed structure 50 with $B1_f$, $B3_m$ hinge portion disposed between B1 end portions was manufactured per a design 50*d* and programmed at different angles as shown in the figure. And as observed in FIG. 12, the programmed angles agreed well with FEA modeling of the design 50*d* and the robust multi-properties provided by the g-DLP printing platform provided a fully folded shape change (with a strain of ~120%) of the g-DLP 3D printed structure 50. Again, the $B3_m$ matrix of the $B1_f$, $B3_m$ hinge portion is shown as transparent for clarity.

It should be understood that this understanding of the underlying mechanics principles enables a general design rationale for complex shape-morphing structures. That is, combining the programmable cold-draw hinge modules with stiff end portions enables the manufacture of complex shape-shifting structures. Furthermore, as mentioned above, the glassy state part demonstrates excellent shape memory performance with reversible plasticity at elevated temperatures. Thus, the deformation of the hinge modules is also reversible which enables the reconfigurability of the printed structures over numerous cycles.

Figure 13A:
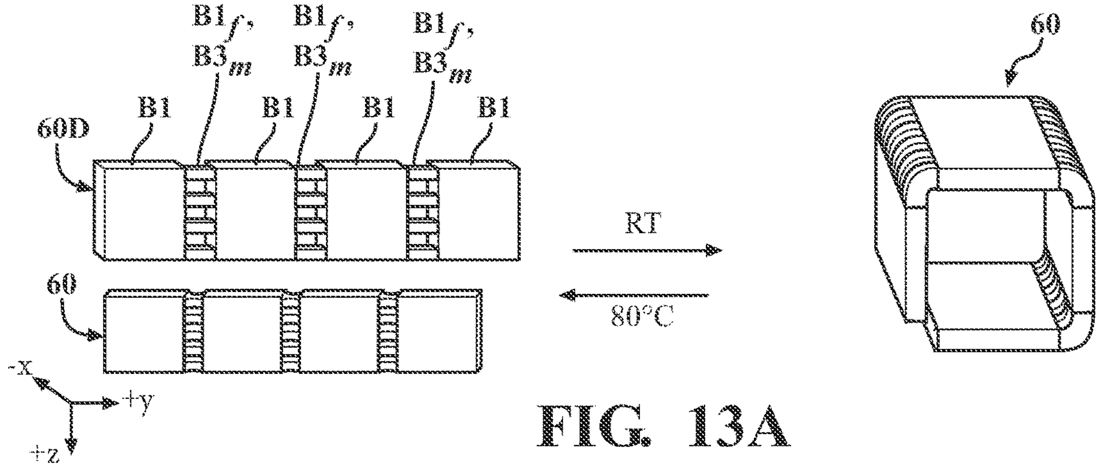
FIG. 13A illustrates a designed and a g-DLP 3D printed hinge module with the g-DLP 3D printed hinge module programmed into a square-shaped configuration according to the teachings of the present disclosure.
Figure 13B:
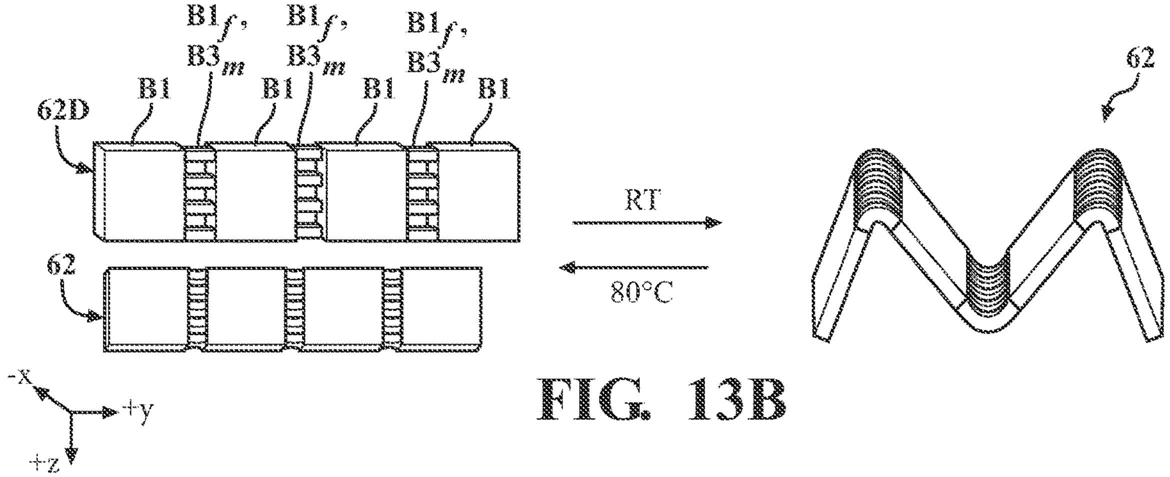
FIG. 13B illustrates a designed and a grayscale g-DLP 3D printed hinge module with the g-DLP 3D printed hinge module programmed into an M-shaped configuration according to the teachings of the present disclosure.

For example, and with reference to FIGS. 13A-13B, a strip sample 60 (g-DLP 3D printed per the design 60*d*) with $B1_f$, $B3_m$ hinge portions disposed between B1 end portions (also referred to herein as "glassy state portions"), and with the $B1_f$ fibers (also referred to herein as "glassy state fibers") on an upper surface (+y direction) of all the $B1_f$, $B3_m$ hinge portions is shown in FIG. 13A. And a strip sample 62 (g-DLP 3D printed per the design 62*d*) with $B1_f$, $B3_m$ hinge portions disposed between B1 end portions with the $B1_f$ fibers on a lower surface (+x direction) of the middle $B1_f$, $B3_m$ hinge portion (i.e., the central $B1_f$, $B3_m$ hinge portion between the two outer $B1_f$, $B3_m$ hinge portions having the $B1_f$ fibers on the upper surface) is shown in FIG. 13B. In addition, the g-DLP 3D printed structure 60 in FIG. 13A was reversibly programmed into a square shape while the g-DLP 3D printed structure 62 in FIG. 13B was reversibly programmed into an M shape via cold draw morphing at 80° C. followed by cooling to room temperature.

Figure 14A:
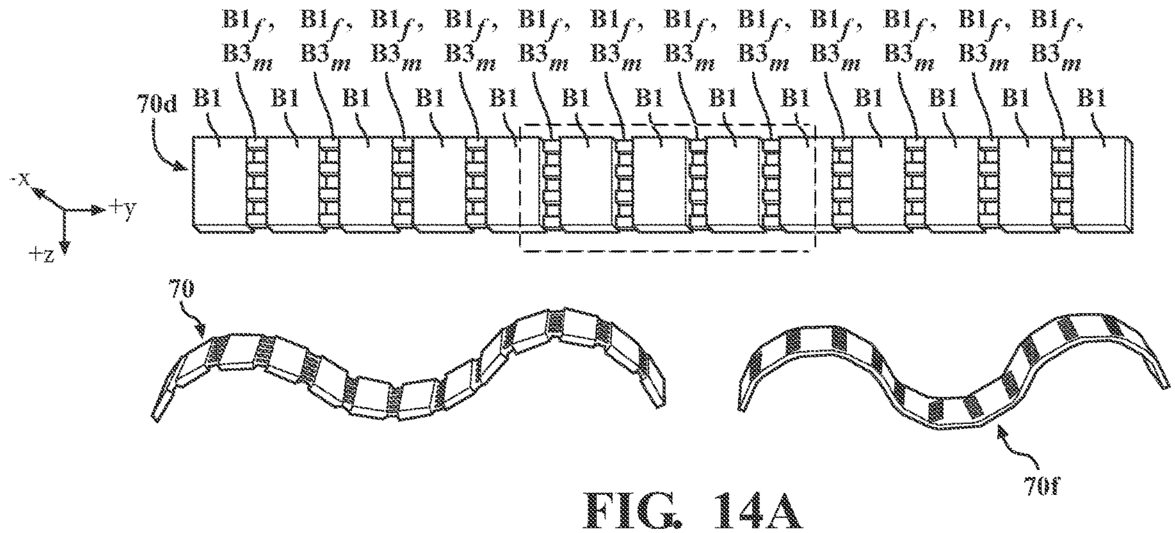
FIG. 14A illustrates a designed and a grayscale g-DLP 3D printed hinge module with the g-DLP 3D printed hinge module programmed into a wave-shaped configuration according to the teachings of the present disclosure.
Figure 14B:
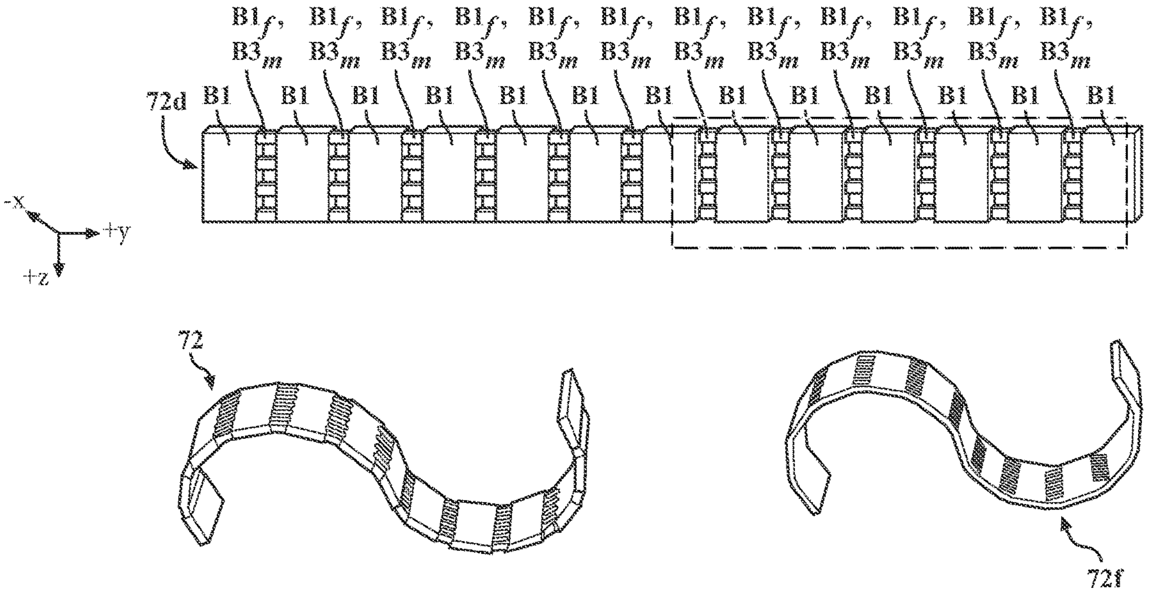
FIG. 14B illustrates a designed and a grayscale g-DLP 3D printed hinge module with the g-DLP 3D printed hinge module programmed into an S-shaped configuration according to the teachings of the present disclosure.

For another example, and with reference to FIGS. 14A-14B, a strip sample 70 (g-DLP 3D printed per the design 70*d*) with $B1_f$, $B3_m$ hinge portions disposed between B1 end portions, and with the $B1_f$ fibers on a lower surface (−x direction) of four (4) of the $B1_f$, $B3_m$ hinge portions shown within the dotted line rectangle and between a pair of four $B1_f$, $B3_m$ hinge portions is shown in FIG. 14A. And with such a configuration, the strip sample 70 was programmed into a wave shape that agreed with an FEA (labeled '70*f*') of the design 70*d*. In addition, a strip sample 72 (g-DLP 3D printed per the design 72*d*) having the same number of B1 end portions and $B1_f$, $B3_m$ hinge portions as the strip sample 70, but with $B1_f$ fibers on a lower surface (−x direction) of six (6) $B1_f$, $B3_m$ hinge portions within the dotted line rectangle and disposed between B1 end portions on the right hand side (+y direction) of the strip sample 72 is shown in FIG. 14B. And with such a configuration, the strip sample 72 was programmed into an S shape that agreed with an FEA (labeled '72*f*') of the design 72*d*.

Figure 15A:
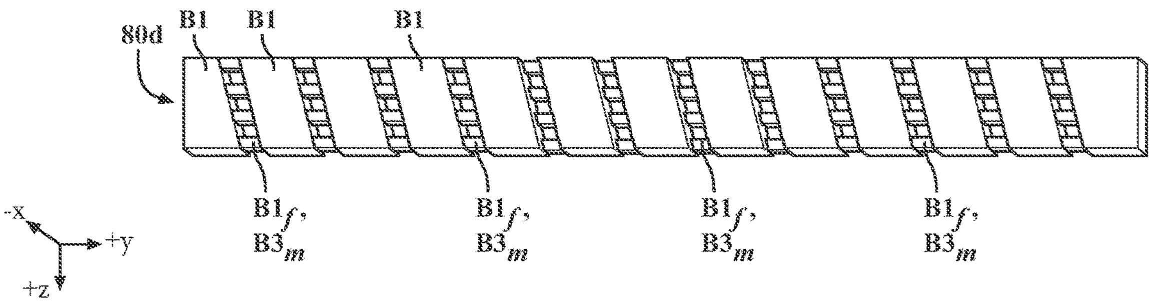
FIG. 15A illustrates a designed g-DLP 3D printed hinge module with hinge portions oriented at a 30 degree angle relative to a length direction according to the teachings of the present disclosure.
Figure 15B:
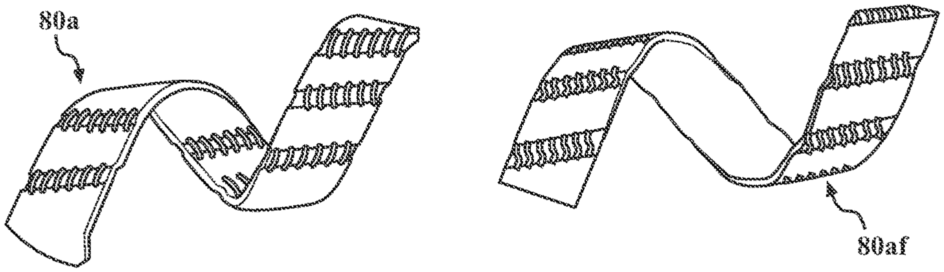
FIG. 15B illustrates a g-DLP 3D printed hinge module and an FEA of the design in FIG. 15A with a helical shape having a first pitch.
Figure 15C:
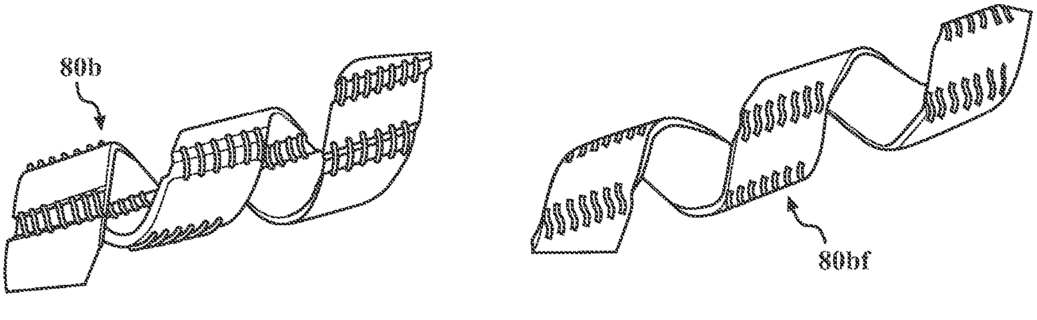
FIG. 15C illustrates a g-DLP 3D printed hinge module and an FEA of the design in FIG. 15A with a helical shape having a second pitch.

And for still another example, and with reference to FIGS. 15A-15C, a strip sample design 80*d* with $B1_f$, $B3_m$ hinge portions disposed between B1 end portions at an angle of 30° relative to the length direction (x-axis) of the design 80*d* is shown in FIG. 15A. In addition, a strip sample 80*a* (g-DLP 3D printed per the design 80*d*) programmed into a helix with a first pitch is shown in FIG. 15B and a strip sample 80*b* (g-DLP 3D printed per the design 80*d*) programmed into a helix with a second pitch different than the first pitch is shown in FIG. 15C. Accordingly, the two dimensional strip samples 80*a*, 80*b* were programmed with out-of-plane bending that resulted in a collective twist of the structure into strip samples 80*a*, 80*b* with 3D helix shapes. Furthermore, the pitch of the strip samples 80*a*, 80*b* was controlled by varying the applied strain and the corresponding FEA simulations 80*af*, 80*bf* based on the heterogeneous hinge structures (i.e., $B1_f$, $B3_m$ hinge portions) were in good agreement with the actual programming and demonstrated accurate angle and direction control of cold-draw shape morphing capability.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the terms "about" and "generally" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A shape-morphing structure comprising:

a monolithic cold draw programmable grayscale digital light processing (g-DLP) 3D printed unitary hinge component comprising at least one glassy state portion and at least one rubbery state portion comprising a rubbery state matrix and glassy state fibers disposed within the rubbery state matrix.

2. The shape-morphing structure according to claim 1, wherein the at least one glassy state portion has a glassy state recovery temperature and the at least one rubbery state matrix has a rubbery state recovery temperature different than the glassy state recovery temperature.

3. The shape-morphing structure according to claim 1, wherein the monolithic cold draw programmable g-DLP 3D printed unitary hinge component is a 4D.

4. The shape-morphing structure according to claim 1, wherein the at least one rubbery state portion is disposed between and unitary with at least two glassy state portions.

5. The shape-morphing structure according to claim 1, wherein the rubbery state matrix and glassy state fibers disposed within the rubbery state matrix are disposed between and unitary with a pair of glassy state portions, and the pair of glassy state portions are homogeneous portions.

6. The shape-morphing structure according to claim 1, wherein the g-DLP 3D printed unitary hinge component is formed from a resin comprising:

a donor moiety in the form of an acrylate monomer with a side group comprising at least one of a free carbonyl, a primary amine on an acrylate, a secondary amine on an acrylate, and a tertiary amine on an acrylate;

an acceptor moiety different than the donor moiety and in the form of an acrylate monomer with a side group comprising at least one of a free hydroxy, a primary amine, a secondary amine, and an imine; and a rigid moiety in the form of an acrylate monomer with a side group comprising one or more of a cyclohexyl, a substituted cyclohexyl, and a bicyclic structure.

7. The shape-morphing structure according to claim 6, wherein one of the donor moiety and the acceptor moiety is a crosslinker.

8. The shape-morphing structure according to claim 1, wherein the g-DLP 3D printed unitary hinge component is formed from a resin comprising a donor moiety selected from at least one of 2-hydroxyethyl acrylate, caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate.

9. The shape-morphing structure according to claim 1, wherein the g-DLP 3D printed unitary hinge component is formed from a resin comprising an acceptor moiety selected from at least one of aliphatic urethane-based diacrylate and 2-hydroxyethyl acrylate.

10. The shape-morphing structure according to claim 1, wherein the g-DLP 3D printed unitary hinge component is formed from a resin comprising a rigid moiety selected from at least one of isobornyl acrylate, 4-acryloylmorpholine, methyl methacrylate, 2-hydroxyethyl methacrylate, and isobornyl methacrylate.

11. The shape-morphing structure according to claim 1, wherein the g-DLP 3D printed unitary hinge component is formed from a resin comprising:

a donor moiety with a content between about 10 wt. % to about 30 wt. % of an overall composition of the resin;

an acceptor moiety with a content between about 10 wt. % to about 30 wt. % of an overall composition of the resin; and a rigid moiety with a content between about 50 wt. % to about 70 wt. % of an overall composition of the resin.

12. The shape-morphing structure according to claim 1, wherein the g-DLP 3D printed unitary hinge component is formed from a resin comprising:

a donor moiety is selected from the group consisting of 2-hydroxyethyl acrylate, caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate;

an acceptor moiety is selected from the group consisting of aliphatic urethane-based diacrylate and 2-hydroxyethyl acrylate; and a rigid moiety is selected from the group consisting of isobornyl acrylate, 4-acryloylmorpholine, methyl methacrylate, 2-hydroxyethyl methacrylate, and isobornyl methacrylate.

13. The shape-morphing structure according to claim 12, wherein:

the donor moiety is between about 10 wt. % to about 30 wt. % of an overall composition of the resin;

the acceptor moiety is between about 10 wt. % to about 30 wt. % of an overall composition of the resin; and the rigid moiety is between about 50 wt. % to about 70 wt. % of an overall composition of the resin.

14. The shape-morphing structure according to claim 1, wherein the g-DLP 3D printed unitary hinge component is formed from a resin comprising:

between about 10 wt. % and about 30 wt. % of a donor moiety in the form of 2-hydroxyethyl acrylate;

between about 10 wt. % and about 30 wt. % of an acceptor moiety in the form of aliphatic urethane-based diacrylate; and between about 50 wt. % to about 70 wt. % of a rigid moiety in the form of isobornyl acrylate.

15. A shape-morphing structure comprising:

a monolithic cold draw programmable grayscale digital light processing (g-DLP) 3D printed unitary hinge component formed from a resin and comprising at least one glassy state portion and at least one rubbery state portion comprising a rubbery state matrix and glassy state fibers disposed within the rubbery state matrix, the resin comprising:

a donor moiety in the form of an acrylate monomer with a side group comprising at least one of a free carbonyl, a primary amine on an acrylate, a secondary amine on an acrylate, and a tertiary amine on an acrylate;

an acceptor moiety different than the donor moiety and in the form of an acrylate monomer with a side group comprising at least one of a free hydroxy, a primary amine, secondary amine, and an imine; and a rigid moiety in the form of an acrylate monomer with a side group comprising of one or more of a cyclohexyl, a substituted cyclohexyl, and a bicyclic structure.

16. The shape-morphing structure according to claim 5, wherein the at least one glassy state portion has a glassy state recovery temperature and the at least one rubbery state matric has a rubbery state recovery temperature different than the glassy state recovery temperature.

17. The shape-morphing structure according to claim 16, wherein the monolithic cold draw programmable g-DLP 3D printed unitary hinge component is a 4D printed structure.

18. A shape-morphing structure comprising:

a monolithic cold draw programmable grayscale digital light processing (g-DLP) 3D printed unitary hinge component formed from a resin and comprising at least one glassy state portion with a glassy state recovery temperature and at least one rubbery state portion with a rubbery state recovery temperature different than the glassy state recovery temperature, the at least one rubbery state portion comprising a rubbery state matrix and glassy state fibers disposed within the rubbery state matrix, and the resin comprising:

a donor moiety in the form of an acrylate monomer with a side group comprising at least one of a free carbonyl, a primary amine on an acrylate, a secondary amine on an acrylate, and a tertiary amine on an acrylate;

an acceptor moiety different than the donor moiety and in the form of an acrylate monomer with a side group comprising at least one of a free hydroxy, a primary amine, secondary amine, and an imine; and a rigid moiety in the form of an acrylate monomer with a side group comprising of one or more of a cyclohexyl, a substituted cyclohexyl, and a bicyclic structure.

19. The shape-morphing structure according to claim 18, wherein the monolithic cold draw programmable g-DLP 3D printed unitary hinge component is a 4D printed structure.

20. The shape-morphing structure according to claim 18, wherein:

the donor moiety is between about 10 wt. % to about 30 wt. % of an overall composition of the resin;

the acceptor moiety is between about 10 wt. % to about 30 wt. % of an overall composition of the resin; and the rigid moiety is between about 50 wt. % to about 70 wt. % of an overall composition of the resin.

* * * * *